(12) United States Patent
Chen et al.

(10) Patent No.: US 7,571,302 B1
(45) Date of Patent: Aug. 4, 2009

(54) DYNAMIC DATA DEPENDENCE TRACKING AND ITS APPLICATION TO BRANCH PREDICTION

(76) Inventors: Lei Chen, 12345 Alameda Trace Cir., #123, Austin, TX (US) 78727; David Albonesi, 7 Estates Dr., Ithaca, NY (US) 14850; Steve Dropsho, Chemin Isabella-de-Montolieu 183, CH1010, Lausanne (CH)

( * ) Notice: Subject to any disclaimer, the term of this patent is extended or adjusted under 35 U.S.C. 154(b) by 261 days.

(21) Appl. No.: 11/050,454

(22) Filed: Feb. 4, 2005

Related U.S. Application Data

(60) Provisional application No. 60/541,362, filed on Feb. 4, 2004.

(51) Int. Cl.
*G06F 9/00* (2006.01)
(52) U.S. Cl. ..................................... 712/217
(58) Field of Classification Search ................ 712/217, 712/214, 216
See application file for complete search history.

(56) References Cited

U.S. PATENT DOCUMENTS

| | | | | |
|---|---|---|---|---|
| 5,201,057 | A * | 4/1993 | Uht | 712/18 |
| 5,546,597 | A * | 8/1996 | Martell et al. | 712/23 |
| 5,627,985 | A * | 5/1997 | Fetterman et al. | 712/217 |
| 5,710,902 | A * | 1/1998 | Sheaffer et al. | 712/216 |
| 5,790,827 | A * | 8/1998 | Leung | 712/216 |
| 6,334,182 | B2 * | 12/2001 | Merchant et al. | 712/214 |
| 6,493,820 | B2 * | 12/2002 | Akkary et al. | 712/235 |
| 7,093,106 | B2 * | 8/2006 | Ambekar et al. | 712/217 |
| 7,127,591 | B2 * | 10/2006 | Asakawa | 712/216 |
| 2003/0177337 | A1 * | 9/2003 | Seki | 712/202 |

OTHER PUBLICATIONS

R. Bahar, et al., "Power and Energy Reduction Via Pipeline Balancing". Compaq Computer Corporation, pp. 218-229.

P. Bird, et al., "The Effective of Decoupling", Presented at the Seventh ACM International Conference on Supercomputing, Tokyo, Japan, Jul. 19-23, 1993, pp. 1-10.

D. Burger, et al. "The SimpleScalar Tool Set, Version 2.0", University of Wisconsin-Madision Computer Sciences Department Technical Report, #1342, Jun. 1997, pp. 1-21.

A. Buyuktosunoglu, et al., "An Oldest-First Selection Logic Implementation for Non-Compacting Issue Queues", pp. 1-5.

B. Calder, "Selective Value Prediction", Department of Computer Science and Engineering, University of California, San Diego, pp. 64-74.

V. Agarwal, M. Hrishikesh, S. W. Keckler, and D. Burger. Clock Rate versus IPC: The End of the Road for Conventional Microarchitectures. 27th Annual International Symposium on Computer Architecture, Jun. 2000.

D. M. Tullsen, S. J. Eggers, J.S. Emer, H. M. Levy, J. L. Lo, and R. L. Stamm. Exploiting Choice: Instruction Fetch and Issue on an Implementable Simuntaneous Multithreading Processor. 23rd Annual International Symposium on Computer Architecture, May 1996.

(Continued)

*Primary Examiner*—Eric Coleman
(74) *Attorney, Agent, or Firm*—Stolowitz Ford Cowger LLP

(57) ABSTRACT

A data dependence table in RAM relates physical register addresses to instructions such that for each instruction, the registers on whose data the instruction depends are identified. The table is updated for each instruction added to the pipeline. For a branch instruction, the table identifies the registers relevant to the branch instruction for branch prediction.

16 Claims, 8 Drawing Sheets

OTHER PUBLICATIONS

A. Tyagi, H.C. Ng, and P.Mohapatra. Dynamic Branch Decoupled Architecture. 1999 IEEE International Conference on Computer Design, Oct. 1999.

D. W. Wall. Limits of Instruction-Level Parellelism. Technical Report 93/6, Digital Western Research Laboratory, Nov. 1993.

K. C. Yeager. The MIPS R10000 Superscalar Microprocessor. IEEE Micro, Apr. 1996.

T.-Y. Yeh and Y. Patt. A Comparison of Dynamic Branch Predictors that use Two Levels of Branch History. 20th International Symposium on Computer Architecture, May 1993.

L. Carter and B. Calder. Using Predicate Path Information in Hardware to Determine True Dependences. 16th Annual ACM International Conference on Supercomputing, Jun. 2002.

I.C. K. Chen, J. T. Coffey, and T. N. Mudge. Analysis of Branch Prediction via Data Compression. 7th International Conference on Architectural Support for Programming Languages and Operating Systems, Oct. 1996.

A. N. Eden and T. Mudge. The YAGS Branch Prediction Scheme. 31st International Symposium on Microarchitecture, Nov. 1998.

A. Farcy, 0. Temam, R. Espasa, and T. Juan. Dataflow Analysis of Branch Mispredictions and Its Application to Early Resolution of Branch Outcomes. 31st International Symposium on Microarchitecture, Nov. 1998.

B. Fields, S. Rubin, and R. Bodik. Focusing Processor Policies via Critical-Path Prediction. 28th Annual International Symposium on Computer Architecture, Jun. 2001.

D. Folegnani and A. Gonzalez. Energy-Efficient Issue Logic. 28th International Symposium on Computer Architecture, Jun. 2001.

] P. N. Glaskowsky. Pentium 4 (partially) previewed. Microprocessor Report, Aug. 2000.

J. Gonzalez and A. Gonzalez. The Potential of Data Value Speculation to Boosst ILP. 1998 International Conference on Supercomputing, Jul. 1998.

M. Goshima, K. Nishino, Y. Nakashima, S Ichiro Mori, T. Kitamura, and S. Tomita. A High-Speed Dynamic Instruction Scheduling Scheme for Superscalar Processors. IPSJ Transactions on High Performance Computing Systems, Dec. 2001.

A. Hartstein and T. R. Puzak. The Optimum Pipeline Depth for a Microprocessor. Proceedings of the 29th Annual International Symposium on Computer Architecture, May 2002.

T. Heil, Z. Smith, and J. Smith. Improving Branch Predictors by Correlating on Data Values. 32nd International Symposium on Microarchitecture, Nov. 1999.

D. A. Jiminez, S. Keckler, and C. Lin. The Impact of Delay on the Design of Branch Predictors. 33rd Annual International Symposium on Microarchitecture, 2000.

R. E. Kessler, E. J. McLellan, and D. A. Webb. The Alpha 21264 Microprocessor Architecture. 1998 International Conference on Computer Design, Oct. 1998.

A. R. Lebeck, J. Koppanalil, T. Li, J. Patwardhan, and E. Rotenberg. A Large, Fast Instruction Window for Tolerating Cache Misses. 29th Annual International Symposium on Computer Architecture, May 2002.

C.-C. Lee, 1.C. K. Chen, and T. N. Mudge. The Bi-Mode Branch Predictor. 30th International Symposium on Microarchitecture, Dec. 1995.

M. Lipasti and J. Shen. Exceeding the Data-Flow Limit Via Value Prediction. 29th International Symposium onMicroarchitecture, Dec. 1996.

P. Michaud, A. Seznec, and R. Uhlig. Trading Conflict and Capacity Aliasing in Conditional Branch Predictors. 24th International Symposium on Computer Architecture, Jun. 1997.

R. Nair. Dynamic Path-Based Branch Correlation. 28th International Symposium on Microarchitecture, Nov. 1995.

S. Sechrest, C.-C. Lee, and T.Mudge. Correlation and Aliasing in Dynamic Btanch Predictors. 23rd International Symposium on Computer Architecture, May 1996.

A. Seznec, S. Felix, V. Krishnan, and Y. Sazeides. Design Tradeoffs for the Alpha EV8 Conditional Branch Predictor. 29th Annual International Symposium on Computer Architecture, May 2002.

B. Simon, B. Calder, and J. Ferrante. Incorporating Predicate Information into Branch Predictors. To appear in the 9th International Symposium on High Performance Computer Architecture, Feb. 2003.

E. Sprangle and D. Carmean. Increasing Processor Performance by Implementing Deeper Pipelines. Proceedings of 29th Annual International Symposium on Computer Architecture, May 2002.

S. Srinivasan et al. Locality vs Criticality. 28th International Symposium on Computer Architecture, Jun. 2001.

S. Srinivasan and A. Lebeck. Load Latency Tolerance in Dynamically Scheduled Processors. 31st International Symposium on Microarchitecture, Nov. 1998.

J. Stark, M. Evers, and Y. N. Patt. Variable Length Path Branch Prediction. 8th International Conference on Architectural Support for Programming Languages and Operating Systems, Oct. 1998.

R. Bahar, et al., "Power and Energy Reduction Via Pipeline Balancing", Compaq Computer Corporation, pp. 218-229, 2001, IEEE.

A. Buyuktosunoglu, et al., "An Oldest-First Selection Logic Implementation for Non-Compacting Issue Queues", pp. 1-5, 15th International ASIC/SOC. Conference, 2002.

B. Calder, "Selective Value Prediction", Department of Computer Science and Engineering, University of California, San Diego, pp. 64-74, 1999, IEEE.

* cited by examiner

FIG. 1A

PHYSICAL REGISTER NUMBER
(ALSO RAM ADDRESS)

VALID VECTOR: positions 1-9

| | Valid | 1 | 2 | 3 | 4 | 5 | 6 | 7 | 8 | 9 | Instruction |
|---|---|---|---|---|---|---|---|---|---|---|---|
| TAIL → 1 | 1 | X | | | X | X | X | X | | | LOAD p1 ← (p2) |
| 2 | 1 | | | | X | X | X | | | | ADD p4 ← p1 + p3 |
| 3 | 1 | | | | | X | X | | | | OR p5 ← p4 or p1 |
| 4 | 1 | | | | | | X | | | | SUB p6 ← p5 - p4 |
| HEAD → 5 | 1 | | | | | | | X | | | ADD p7 ← p1 + 1 |
| 6 | 0 | | | | | | | | | | |
| 7 | 0 | | | | | | | | | | |
| 8 | 0 | | | | | | | | | | |
| 9 | 0 | | | | | | | | | | |

(RAM bit columns)

FIG. 1B

PHYSICAL REGISTER NUMBER
(ALSO RAM ADDRESS)

| | Valid | 1 | 2 | 3 | 4 | 5 | 6 | 7 | 8 | 9 | Instruction |
|---|---|---|---|---|---|---|---|---|---|---|---|
| TAIL → 1 | 1 | X | | | X | X | X | X→X | | | LOAD p1 ← (p2) |
| 2 | 1 | | | | X | X | X | | X | | ADD p4 ← p1 + p3 |
| 3 | 1 | | | | | X | X | | | | OR p5 ← p4 or p1 |
| 4 | 1 | | | | | | X | | | | SUB p6 ← p5 - p4 |
| HEAD → 5 | 1 | | | | | | | X→X | | | ADD p7 ← p1 + 1 |
| 6 | 0 | | | | | | | | X← | | ADD p8 ← p4 + p7 |
| 7 | 0 | | | | | | | | | | |
| 8 | 0 | | | | | | | | | | |
| 9 | 0 | | | | | | | | | | |

(RAM bit columns)

FIG. 7

```
INSTAB *lookupdisasm(UINT key)
{
    INSTAB *ptr=hashtab[key % HASHVAL];

while (ptr !=NULL && ptr ->opcode != key)
        ptr = ptr ->next;
```

LOAD BRANCH RATE

PREDICTION RATE

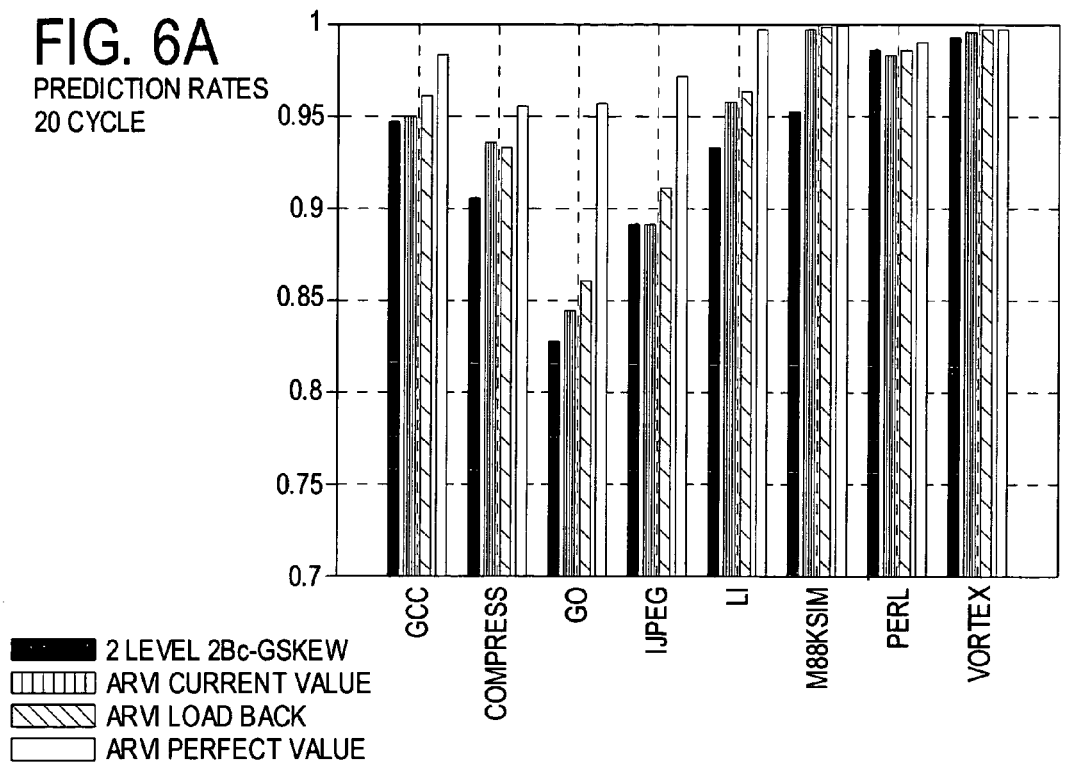
FIG. 6A PREDICTION RATES 20 CYCLE
- 2 LEVEL 2Bc-GSKEW
- ARVI CURRENT VALUE
- ARVI LOAD BACK
- ARVI PERFECT VALUE
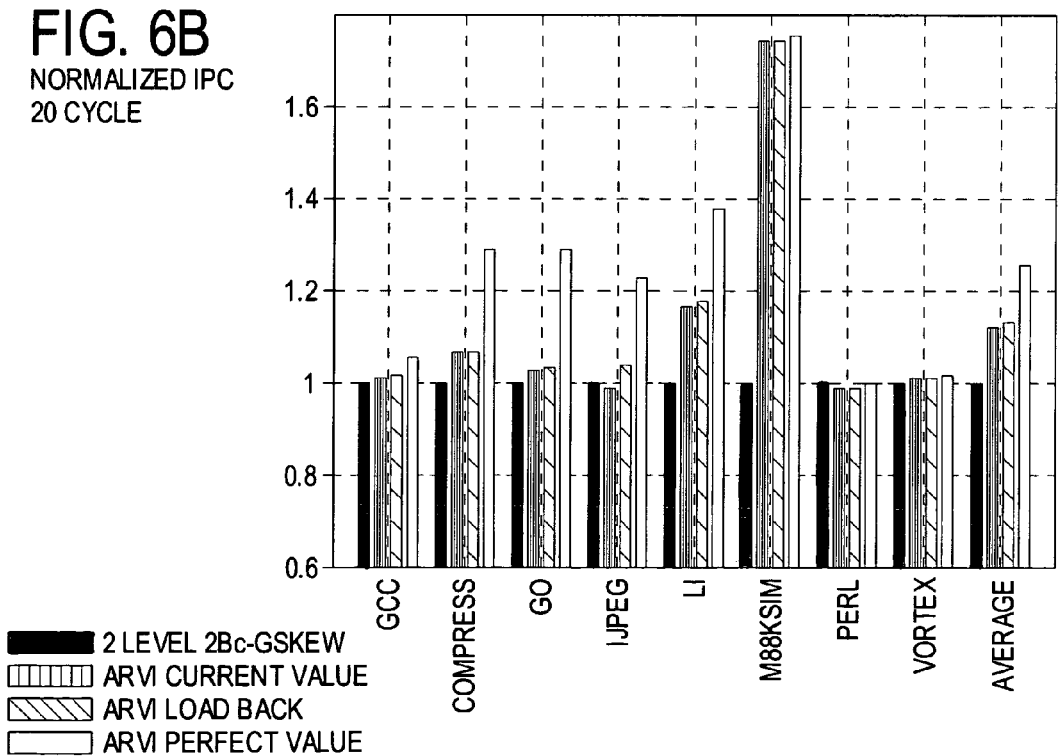
FIG. 6B NORMALIZED IPC 20 CYCLE
- 2 LEVEL 2Bc-GSKEW
- ARVI CURRENT VALUE
- ARVI LOAD BACK
- ARVI PERFECT VALUE

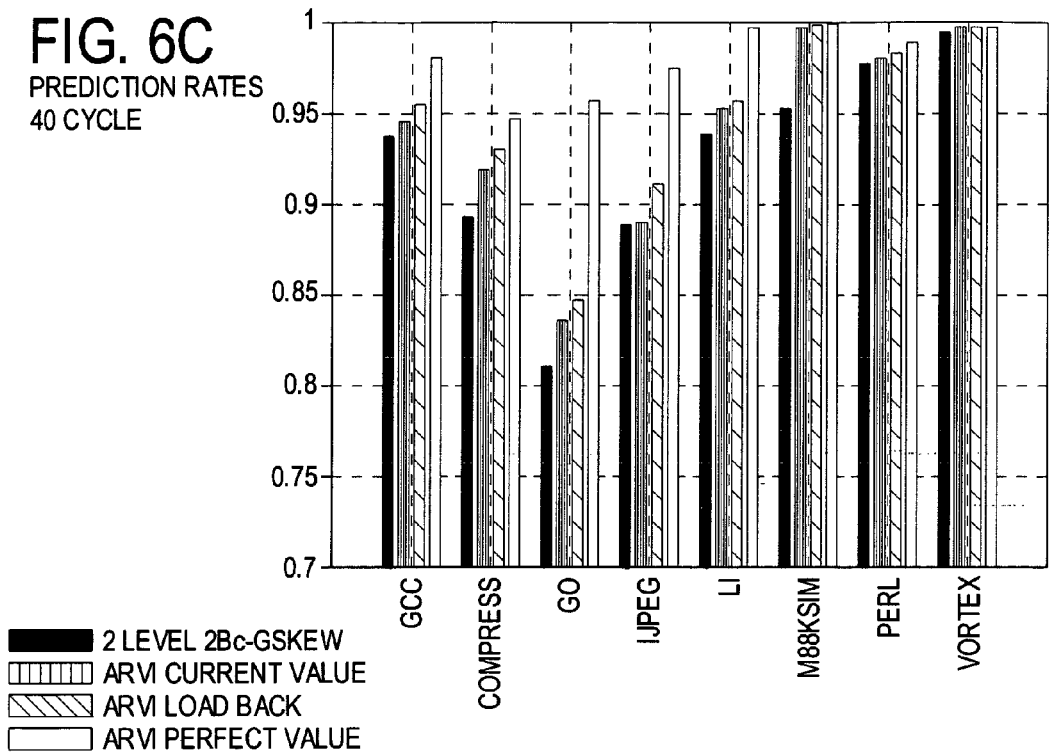
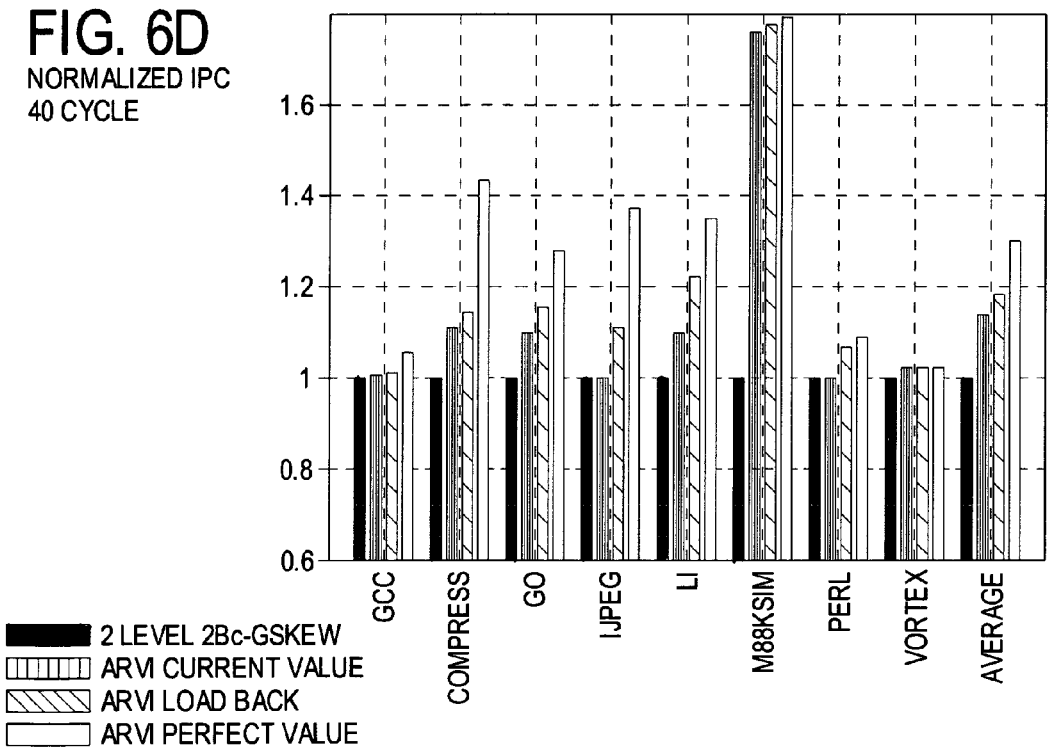

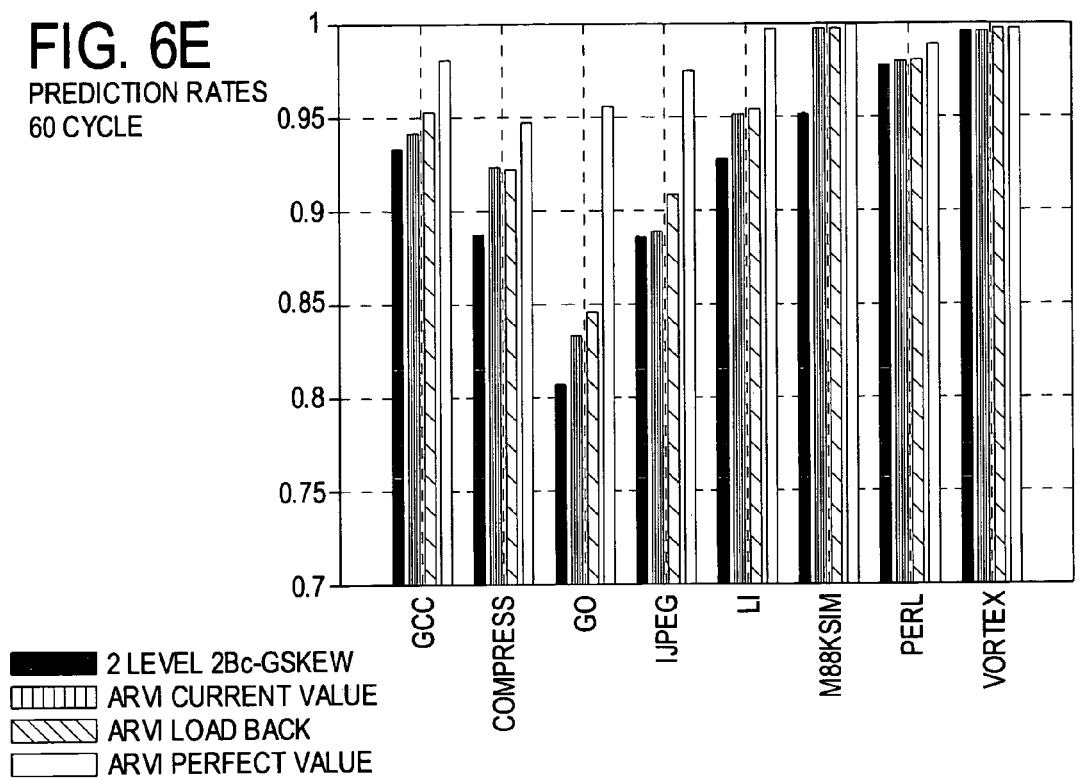
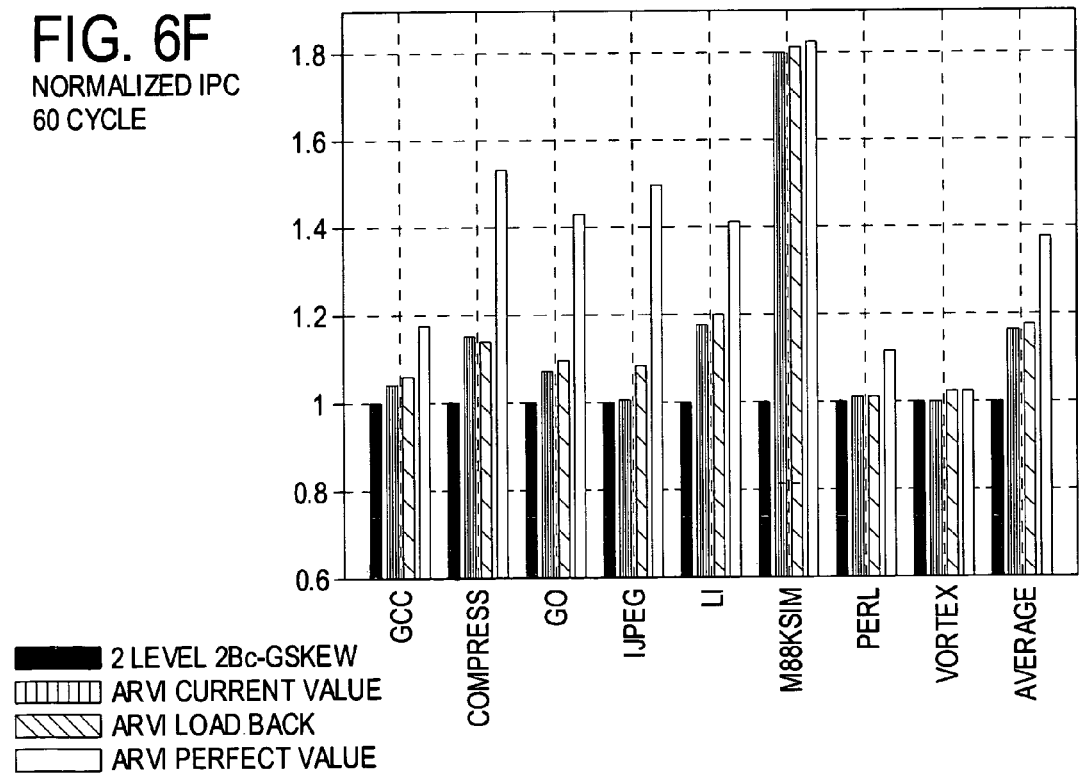

DYNAMIC DATA DEPENDENCE TRACKING AND ITS APPLICATION TO BRANCH PREDICTION

REFERENCE TO RELATED APPLICATION

The present application claims the benefit of U.S. Provisional Patent Application No. 60/541,362, filed Feb. 4, 2004, whose disclosure is hereby incorporated by reference in its entirety into the present disclosure.

STATEMENT OF GOVERNMENT INTEREST

The work leading to the present invention was supported in part by NSF grants CCR-9701915 and CCR-9811929 and by DARPA/IPTO under AFRL contract F29601-00-K-0182. The government has certain rights in the invention

FIELD OF THE INVENTION

The present invention is directed to processor design and more particularly to a mechanism for dynamically tracking the data dependence chains of the instructions in a pipeline. The present invention is further directed to a technique for value-based branch prediction using such a mechanism.

DESCRIPTION OF RELATED ART

Much of the effort expended by microprocessor architects in the last decade has been centered on exploiting the inherent instruction-level parallelism (ILP) of serial programs. Examples include dynamic branch prediction, speculation, out-of-order superscalar execution, and parallel memory access. However, ILP performance gains have slowed considerably as these techniques have become commonplace in 4- and 6-way issue processors. A number of program properties, including control dependences, memory requirements, and data dependences, threaten to limit further gains. The latter has long been cited in limit studies, such as the well-known study by Wall [34], as the inherent program characteristic that fundamentally limits ILP gains. Value prediction [22], though a promising approach for alleviating data dependence barriers, has yet to yield the cost-performance gains necessary for widespread commercial adoption. For these reasons, the alleviation of data dependences, and the exploitation of data dependence information, remain key microarchitectural challenges.

Compilers have long performed static data dependence analysis for code optimizations. Such information could be invaluable to microarchitects for many purposes. Yet, such static information is both unwieldly to pass via instruction fields and potentially less precise than the dynamic data dependence information that could be gleaned at runtime.

The following references will be cited in the present application by the numbers in brackets:

[1] V. Agarwal, M. Hrishikesh, S. W. Keckler, and D. Burger. Clock Rate versus IPC: The End of the Road for Conventional Microarchitectures. 27th Annual International Symposium on Computer Architecture, pages 248-259, June 2000.

[2] R. Bahar and S. Manne. Power and Energy Reduction Via Pipeline Balancing. 28th International Symposium on Computer Architecture, pages 218-229, June 2001.

[3] P. L. Bird, A. Rawsthome, and N. P. Topham. The Effectiveness of Decoupling. 7th International Conference of Supercomputing, pages 47-56, 1993.

[4] D. Burger and T. Austin. The Simplescalar Toolset, Version 2.0. Technical Report TR-97-1342, University of Wisconsin-Madison, June 1997.

[5] A. Buyuktosunoglu, A. El-Moursy, and D. H. Albonesi. An Oldest-First Selection Logic Implementation for Non-Compacting Issue Queues. 15th International ASIC/SOC Conference, pages 31-35, September 2002.

[6] B. Calder, G. Reinman, and D. M. Tullsen. Selective Value Prediction. 26th Annual International Symposium on Computer Architecture, pages 64-74, May 1999.

[7] L. Carter and B. Calder. Using Predicate Path Information in Hardware to Determine True Dependences. 16th Annual ACM International Conference on Supercomputing, pages 230-240, June 2002.

[8] I.-C. K. Chen, J. T. Coffey, and T. N. Mudge. Analysis of Branch Prediction via Data Compression. 7th International Conference on Architectural Support for Programming Languages and Operating Systems, pages 128-37, October 1996.

[9] A. N. Eden and T. Mudge. The YAGS Branch Prediction Scheme. 31st International Symposium on Microarchitecture, pages 69-77, November 1998.

[10] A. Farcy, O. Temam, R. Espasa, and T. Juan. Dataflow Analysis of Branch Mispredictions and Its Application to Early Resolution of Branch Outcomes. 31st International Symposium on Microarchitecture, pages 59-68, November 1998.

[11] B. Fields, S. Rubin, and R. Bodik. Focusing Processor Policies via Critical-Path Prediction. 28th Annual International Symposium on Computer Architecture, pages 74-85, June 2001.

[12] D. Folegnani and A. Gonzalez. Energy-Efficient Issue Logic. 28th International Symposium on Computer Architecture, pages 230-239, June 2001.

[13] P. N. Glaskowsky. Pentium 4 (partially) previewed. Microprocessor Report, pages 10-13, August 2000.

[14] J. Gonzalez and A. Gonzalez. The Potential of Data Value Speculation to Boost ILP. 1998 International Conference on Supercomputing, pages 21-8, July 1998.

[15] M. Goshima, K. Nishino, Y. Nakashima, S. ichiro Mori, T. Kitamura, and S. Tomita. A High-Speed Dynamic Instruction Scheduling Scheme for Superscalar Processors. IPSJ Transactions on High Performance Computing Systems, pages 225-236, December 2001.

[16] A. Hartstein and T. R. Puzak. The Optimum Pipeline Depth for a Microprocessor. Proceedings of 29th Annual International Symposium on Computer Architecture, pages 7-13, May 2002.

[17] T. Heil, Z. Smith, and J. Smith. Improving Branch Predictors by Correlating on Data Values. 32nd International Symposium on Microarchitecture, pages 28-37, November 1999.

[18] D. A. Jimenez, S. Keckler, and C. Lin. The Impact of Delay on the Design of Branch Predictors. 33rd Annual International Symposium on Microarchitecture, pages 67-76, 2000.

[19] R. E. Kessler, E. J. McLellan, and D. A. Webb. The Alpha 21264 Microprocessor Architecture. 1998 International Conference on Computer Design, pages 24-36, October 1998.

[20] A. R. Lebeck, J. Koppanalil, T. Li, J. Patwardhan, and E. Rotenberg. A Large, Fast Instruction Window for Tolerating Cache Misses. 29th Annual International Symposium on Computer Architecture, pages 59-70, May 2002.

[21] C.-C. Lee, I.-C. K. Chen, and T. N. Mudge. The Bi-Mode Branch Predictor. 30th International Symposium on Microarchitecture, pages 4-13, December 1995.

[21] M. Lipasti and J. Shen. Exceeding the Data-Flow Limit Via Value Prediction. 29*th International Symposium on Microarchitecture*, pages 226-237, December 1996.

[23] P. Michaud, A. Seznec, and R. Uhlig. Trading Conflict and Capacity Aliasing in Conditional Branch Predictors. 24*th International Symposium on Computer Architecture*, pages 292-303, June 1997.

[24] R. Nair. Dynamic Path-Based Branch Correlation. 28*th International Symposium on Microarchitecture*, pages 15-23, November 1995.

[25] S. Sechrest, C.-C. Lee, and T. Mudge. Correlation and Aliasing in Dynamic Branch Predictors. 23*rd International Symposium on Computer Architecture*, pages 22-31, May 1996.

[26] A. Seznec, S. Felix, V. Krishnan, and Y. Sazeides. Design Tradeoffs for the Alpha EV8 Conditional Branch Predictor. 29*th Annual International Symposium on Computer Architecture*, pages 295-306, May 2002.

[27] B. Simon, B. Calder, and J. Ferrante. Incorporating Predicate Information into Branch Predictors. To appear in the 9*th International Symposium on High Performance Computer Architecture*, February 2003.

[28] E. Sprangle and D. Carmean. Increasing Processor Performance by Implementing Deeper Pipelines. *Proceedings of 29th Annual International Symposium on Computer Architecture*, pages 25-36, May 2002.

[29] S. Srinivasan et al. Locality vs Criticality. 28*th International Symposium on Computer Architecture*, pages 132-143, June 2001.

[30] S. Srinivasan and A. Lebeck. Load Latency Tolerance in Dynamically Scheduled Processors. 31*st International Symposium on Microarchitecture*, pages 148-159, November 1998.

[31] J. Stark, M. Evers, and Y. N. Patt. Variable Length Path Branch Prediction. 8*th International Conference on Architectural Support for Programming Languages and Operating Systems*, pages 170-179, October 1998.

[32] D. M. Tullsen, S. J. Eggers, J. S. Emer, H. M. Levy, J. L. Lo, and R. L. Stamm. Exploiting Choice: Instruction Fetch and Issue on an Implementable Simultaneous Multithreading Processor. 23*rd Annual International Symposium on Computer Architecure*, pages 191-202, May 1996.

[33] A. Tyagi, H.-C. Ng, and P. Mohapatra. Dynamic Branch Decoupled Architecture. 1999 *IEEE International Conference on Computer Design*, pages 442-451, October 1999.

[34] D. W. Wall. Limits of Instruction-Level Parallelism. Technical Report 93/6, Digital Western Research Laboratory, November 1993.

[35] K. C. Yeager. The MIPS R10000 Superscalar Microprocessor. *IEEE Micro*, pages 28-40, April 1996.

[36] T.-Y. Yeh and Y. Patt. A Comparison of Dynamic Branch Predictors that use Two Levels of Branch History. 20*th International Symposium on Computer Architecture*, pages 257-266, May 1993.

SUMMARY OF THE INVENTION

It is an object of the invention to overcome the above-noted deficiencies of the prior art.

To achieve the above and other objects, the present invention is directed to accurate and efficient hardware-based mechanisms for cycle-by-cycle tracking of data dependences among all in-flight instructions in a dynamic superscalar microprocessor.

The present invention includes schemes appropriate for centralized physical register files (as in the Mips R10000 [35] and Alpha 21264 [19] microprocessors). A four-way fetch/issue/commit processor with 80 in-flight instructions and 72 physical integer registers requires 730 bytes of RAM with eight read and four write ports and modest control logic for data dependence tracking. This complexity compares favorably with that of other on-chip RAM/CAM structures (e.g., branch predictors, out-of-order issue queues) that are purely used for performance purposes.

There are many applications for such on-line data dependence information. These include dynamic scheduling, selective value prediction [6], criticality measures and their application [11, 29, 30], and decoupled architectures [3, 33] to name a few. In the present disclosure, it will be shown in depth how dynamic data dependence information can be exploited to provide another dimension for branch prediction. The preferred embodiment called ARVI, bases its prediction on partial register values along the data dependence chain leading up to the branch. This is a subtle but important difference from approaches that use the branch register values directly as they are rarely available (and thus, for instance, must be predicted). The correlation between such register value information and the branch outcome can for some branches be stronger than either history or path information. A two-level predictor using ARVI at the second level achieves a 12.6% overall IPC improvement for the SPEC95 integer benchmarks as compared to the state-of-the-art two-level predictor [26] proposed for the Alpha EV8.

There are many potential applications of online, cycle-by-cycle, data dependence tracking. Some examples:

Dynamic scheduling: Instruction issue priority can be partially based on data dependence properties. One possibility is to assign priority to loads partially based on the length of their dependence chains. It is an incremental addition to the basic DDT (Data Dependence Table) design to track the number of data dependent instructions trailing particular instructions. By adding a small counter to each row in the DDT, this information can be updated for each instruction simultaneously on a cycle-by-cycle basis.

Instruction fetching in SMT processors: In an SMT processor, instructions are fetched from the highest-priority threads according to some criteria. In Tullsen's ICOUNT policy [32], for example, priority is given to those threads that have the fewest instructions in the front-end and issue queues. Part of the rationale is that such threads should be rewarded for making forward progress. Per-thread data dependence chain information, e.g., the average length of each chain, can potentially provide a more accurate measure of the likelihood of a particular thread making forward progress in the near future. The above counter mechanism can be used to calculate these values on a per-thread basis using per-thread DDTs.

Selected value prediction: In value prediction, the relatively high cost of a misprediction and the relatively low prediction accuracy (in general) makes it imperative that it be applied wisely. Calder et al. [6] restrict value prediction to instructions whose early resolution can have significant impact on overall performance. Their heuristic selects as critical instructions those which have a long data dependence chain waiting on their outcome. However, no mechanism for determining this length is described. Using the mechanism described above, those instructions that exceed a threshold count may be selected for value prediction.

Dynamic branch decoupled architectures: In these designs, the string of instructions comprising the dependence chain to a branch in a loop are segregated and executed in a parallel branch execution unit (BEX). Since the set of instructions in the dependence chain is fewer than the full set of instructions in the loop, the BEX unit will run ahead of the main execution unit and precompute branch outcomes so that, ideally, the main loop will never mispredict the outcome of the branch. In the DDT table, the data dependence chain is immediately available.

Optimizations driven by parallelism metrics: Bahar and Manne [2] propose gating off pipeline resources based on recent IPC performance in order to save power. Similarly, Folegnani [12] dynamically adapts the size of the issue queue according to parallelism estimates derived from the Reorder Buffer. Dependence chain information can potentially provide a more accurate parallelism estimate to guide these and other parallelism-based optimizations Improving the accuracy of criticality measures: Load criticality was originally investigated by Srinivasan and Lebeck [29, 30] in order to improve load performance. Other researchers, including Bodik [11], have proposed techniques for identifying critical instructions. Cycle-by-cycle dependence chain information can potentially improve the accuracy of critical instruction detection. For instance, Bodik's random sampling approach may unintentionally miss critical sequences. Data dependence information can potentially provide more directed, rather than random, sampling to increase critical instruction detection.

Dynamic branch prediction: History and path-based branch prediction can be augmented with a predictor that correlates the register values of instructions along the data dependence chain leading up to the branch. This is a subtle, but important, difference from approaches that use the branch register values directly and thereby achieve limited improvements.

In [15, 20], limited data dependence information is used to reduce the wakeup time of the issue queue. In [15], for each instruction in the issue queue, a matrix tracks only the instructions immediately dependent upon it. In [20], a standard issue queue is backed by a large buffer where instructions waiting on a load miss are stored. In both designs, only dependence information to the next instruction in the chain is used. The design in [20] does construct longer dependence chains, but it does so over multiple clock cycles by following one step in the chain each cycle. In contrast, the present invention maintains the full data dependence chain cycle-by-cycle at register rename. This provides the dependence information earlier in the pipeline which is required for branch prediction. A subtle, but important difference is that the present invention constructs the data dependence chains for all instructions as they are renamed and does not require an associative search to detect dependences incrementally.

Predication to convert IF clauses into conditionally executed statements as supported by Intel's IA64 processor can result in false dependences between uses of a logical register along mutually exclusive paths. A hardware mechanism is proposed in [7] to track data dependences between predicates and reveal predicates that are in fact disjoint and can be executed in parallel.

A predicated branch (a branch within a predicated clause) has an implied data dependency with the predicate register guarding the branch. If the value of the predicate register is resolved to false then all branches predicated upon that condition can be squashed (and trivially predicted as not taken). The *Predicate Enhanced Prediction* (PEP) architecture proposed in [27] records the predicate register in order to perform a look up of its value as part of the branch prediction. For an instruction set that supports predication, the DDT would include the predicate register as an explicit data dependence.

Most current dynamic branch predictors use some combination of the branch address, path information [24], and the local/global history [26, 36] of branch outcomes to make the prediction. Despite many attempts to improve predictor mechanisms and eliminate aliasing [9, 21, 23, 25, 31], only small incremental improvements have been realized with these approaches. There is still a large number of dynamic branches that are mispredicted, e.g., for go. Current branch predictor designs appear to be reaching the limit relative to the type of input information provided [8]. Related approaches that include additional information into the branch prediction process involve correlating the actual branch register values with the branch outcome [14] using a conventional value predictor. ARVI attempts to predict values based on the current state along the data dependence chain. If the generating values are present then ARVI's predictions are near perfect. Heil [17] proposed another approach that correlates on the differences between branch source operand values. That approach uses a limited amount of data dependence information. The DDT circuit provides ARVI with more complete data dependence information.

Branch decoupled architectures [3, 10, 33] execute branch-related instructions on a branch processor and feed the control flow result to the main processor. By executing the few instructions leading to branches on a separate engine, outcomes can be computed before the main thread encounters the branch, thus, eliminating prediction of these branches all together. In [10], instruction tagging by the compiler was proposed to select the data dependence chains for branches. The dynamic design in [33] separated the branch execution stream at run-time but a hardware design to discover the data dependence chain was not proposed. DDT could be employed to select the set of instructions to run in the separate branch engine.

Much of the work in microarchitecture research has been to improve the effective ILP that the processor can exploit. Data dependence information infers the true ILP of a sequence of instructions. The present invention allows the realization of a practical hardware design, the DDT, for maintaining precise data dependence information between the in-flight instructions. Practical access to accurate dependence data suggests many possible uses from instruction scheduling to instruction filtering. One application of the DDT which will be set forth in detail is the branch predictor ARVI. ARVI makes predictions based on values in registers in the dependence chain. This highly selective use of information leverages the key feature of data dependence information: only information directly related to the outcome of the branch is used in the prediction table. The improved prediction accuracy results in IPC improvements of 12.6% in a 20-stage pipeline and 15.6% in a longer 60-stage pipeline.

The following paper describes the invention and is hereby incorporated by reference in its entirety into the present disclosure: Lei Chen et al, "Dynamic Data Dependence Tracking and its Application to Branch Prediction," *Proceedings of the Ninth International Symposium on High-Performance Computer Architecture (HPCA-9'03)*, pp. 65-76.

BRIEF DESCRIPTION OF THE DRAWINGS

A preferred embodiment of the present invention will be set forth in detail with reference to the drawings, in which:

FIGS. 1A and 1B show a DDT update example;

FIG. 6A shows prediction accuracy for a 20-stage pipeline;
FIG. 6B shows normalized IPC for a 20-stage pipeline;
FIG. 6C shows prediction accuracy for a 40-stage pipeline;
FIG. 6D shows normalized IPC for a 40-stage pipeline;
FIG. 6E shows prediction accuracy for a 60-stage pipeline;
FIG. 6F shows normalized IPC for a 60-stage pipeline; and
FIG. 7 shows code used in a value-based branch instance.

DETAILED DESCRIPTION OF THE PREFERRED EMBODIMENT

Figure 2:
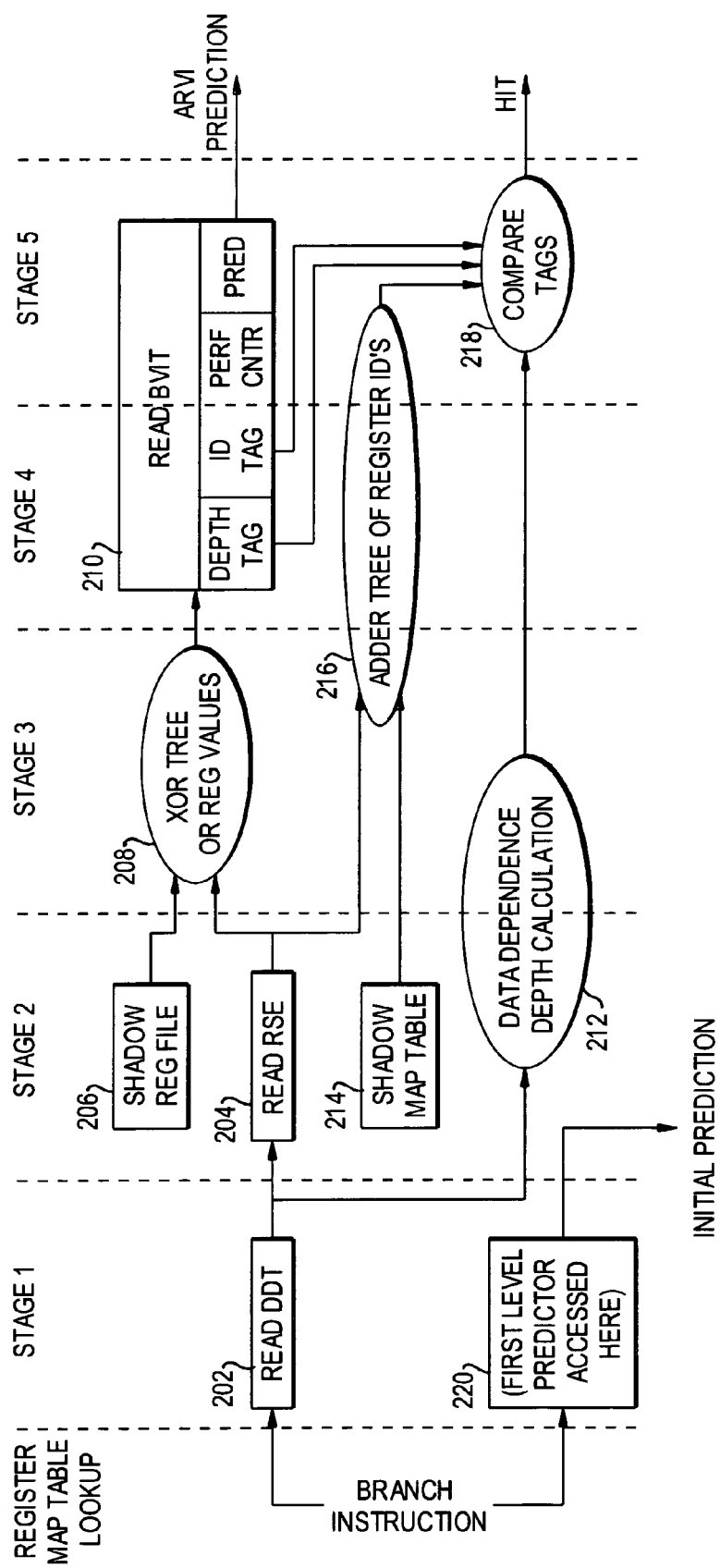
FIG. 2 is a flow chart showing the ARVI predictor for a 20-stage pipeline.

A preferred embodiment of the present invention and results therefrom will be disclosed in detail with reference to the drawings.

Data dependence analysis is a fundamental technique employed in compilers to maintain the correctness of code when performing optimization transformations. A data dependence chain shows ordering relationships between a sequence of instructions that must be preserved. A data dependence chain is defined relative to a particular instruction. Each instruction has its own data dependence chain, though different chains may share common instructions.

A description follows of the *Data Dependence Table* (*DDT*), a hardware method for incrementally maintaining the data dependence chains for the set of instructions in the processor pipeline.

The DDT is implemented as a RAM. The depth of the RAM is one row for each physical register. The width of a row is one bit per instruction that can be in flight in the pipeline, thus, each instruction occupies a column in the DDT RAM. For clarity, we will refer to data in the row of the DDT RAM as a DDT register entry or simply as a register entry. Also, we refer to the instruction information occupying a column in the RAM as a DDT instruction entry or as an instruction entry. The operation of the DDT is best described with an example, shown in FIGS. 1A and 1B. In these figures, the DDT RAM is oriented at 90 degrees, i.e., rows of the RAM are shown as vertical and columns are shown as horizontal. Let us assume the current state as shown in FIG. 1A with the instructions entered into the DDT shown at the right. The physical register numbers are shown at the top. Entries with an 'x' indicate that the bit is set and the physical register depends on that instruction. For example, physical register p5 is data dependent on both instructions 1 and 2. Register p5 is also trivially data dependent on its own instruction (3), so that entry is marked as well.

FIG. 1B details the actions when a new instruction is added. The instruction is an add of registers p4 and p7 with the result deposited into p8. Since p8 is the target register, we need to set the appropriate bits in register entry for p8. The instruction is allotted the next empty instruction entry in the table, instruction entry 6. The bit at instruction entry 6, register entry 8 is set because every register is data dependent upon the instruction that updates it. Then register entries associated with the source registers, p4 and p7, are OR'd and the result is AND'd with the valid bit vector to limit the result only to settings from active instructions currently in the pipeline. The result is then written to the register 8 entry:

DDT[Target]=(DDT[Src1] OR DDT[Src2]) AND Valid-Vector.

The entry for physical register p8 now contains the data dependence chain consisting of instructions 1, 2, 5, and 6. Instruction entries are allocated in circular FIFO fashion using head and tail pointers. For each instruction, access to the DDT occurs after register rename has assigned physical registers. Once the physical registers are known, two simultaneous reads of the source register entries are performed in one cycle and the result is written to the destination register's entry in the second cycle.

When an instruction commits it must be eliminated from all dependence chains because its register value is now ready for immediate use. An instruction is removed from the DDT by clearing its associated bit in the valid vector. Since all reads from the DDT are conditioned by the valid vector, clearing a valid bit immediately removes the associated instruction from henceforth being included in any dependence chains. Additionally, the tail pointer to the DDT circular buffer is incremented to free the instruction entry for reuse. However, before a new instruction reuses an instruction entry, all bits in the instruction entry must be cleared. A branch misprediction requires a rollback of the DDT information to its state prior to the mispredicted branch. Since the structure of the DDT is similar to the Reorder Buffer (ROB), this rollback is achieved in an identical fashion. Just as in the ROB a pointer is decremented to point to the instruction before the mis-speculated instruction so, too, is the pointer in the DDT.

In the present embodiment, we consider only consider data dependences involving integer registers, although, of course, other data dependencies can be used in the present invention. The number of bits in the DDT is the number of ROB entries times the number of physical registers. The Alpha 21264 has 80 ROB entries and 72 physical registers; thus, the DDT would contain 5760 bits, or 730 bytes. In an architecture that fetches four instructions per cycle, the DDT RAM requires eight read ports and four write ports. The valid vector can be implemented as a set of JK flip-flops with one flip-flop per ROB entry, each of which can be set and reset by the rename and commit logic, respectively. The Alpha 21264 would require 80 bits for the valid vector.

A description follows of a branch prediction mechanism that uses an augmented DDT design to quickly select the minimum set of registers in the data dependence chain upon which the branch outcome depends, and uses partial register values to make the prediction.

A branch instruction makes a decision based on the relationship between two values. The two values may be values in registers or one may be in a register and the other a constant. For a given path to the branch, if all the register values involved in its resolution have identical values as in a prior occurrence then the outcome will be the same. If one can determine the essential values in the data dependence chain that determine the final values at the branch, and those values have occurred in the past, then the outcome of the branch will be known. This method is value-based branch prediction.

Upon fetching a branch instruction, a prediction must be made based on the available information at that time. Ideally, if the values of the branch registers are available (i.e., committed) then a table look up can provide the outcome of the branch the last time those same values were present. In practice, the branch register values are rarely available at the time of the prediction. However, if values are available for registers along the dependence chain that leads up to the branch, then the predictor can use these values to index into a table and recall how the branch behaved the last time under the same circumstances. If the register set and value information is precise, then the branch must behave identically and the prediction can be made with certainty.

Prior work has shown that the path leading to a branch provides important information with which to classify instances of a branch. Behavior of a branch within a particular class (path) generally exhibits consistent behavior that a two bit saturating counter quickly learns. Instead of relying solely on branch history or a hash of branch PC addresses to identify the particular path, ARVI includes the data dependent register set as part of the signature and uses a hash of the register identifiers and the PC as an index into a table. The values in each of the registers in the set are likewise hashed together and used as a tag to disambiguate between occurrences of the same path but having different values in the registers. A distinguishing feature of the ARVI design is that it uses both path- and value-based information to classify branch instances.

Loops present an additional challenge in creating a unique path signature. In a heavily pipelined superscalar processor (20+ stages and 200+ instructions in flight simultaneously), the data dependence chain can span many iterations of a loop. In such circumstances, the data dependent register set may be the same in each iteration and make the path information ambiguous. A simple technique to disambiguate between iterations—without actually identifying loop constructs—is to include distance information between the instance of the register set whose values are used and the branch instruction. The ARVI design records as part of a tag the maximum number of instructions spanned by the dependence chain.

ARVI uses the DDT to extract the set of registers corresponding to instructions along the data dependence chain leading up to the branch. A table look up indexed by a combination of the branch PC and the values in the register set returns information describing past branch behavior. Tag checks ensure that the entry corresponds to a prior, similar occurrence of the branch. If the tags match, then the prior outcome is used as the prediction. Since ARVI requires the physical register mappings, register rename must occur early in the pipeline. RISC instruction set architectures with highly regular instruction encodings permit this early register rename at fetch time. However, early rename requires additional physical registers because more mapped instructions can be in flight in the pipeline. The details to generate a prediction in the ARVI predictor are listed in Table 1 and their staging is shown in FIG. 2. To make a prediction, the data dependence chain for the branch register is read from the DDT in step 202. This vector is fed to a filter called the Register Set Extractor (RSE) which, in step 204, forms the set of active registers that generate the value(s) being compared in the branch. A shadow register file (to be described below with reference to FIG. 4A) is read in step 206, and the contents of the shadow register file and the RSE are XORed in step 208. From the PC and values in the register set, the index into the Branch Value Information Table (BVIT) is generated in step 210. The BVIT holds tags and information regarding prior branch occurrences. In parallel with the above, the data dependence depth is calculated in step 212, and a shadow map table (to be described below with reference to FIG. 4B) is read in step 214 and used to form an adder tree of register ID's in step 216. The read of the BVIT returns one tag based on the sum of the register identifiers, a second tag based on the length of the data dependence chain, a performance counter to aid in set replacement, and the prediction. A tag comparison is done in step 218 to verify a hit.

TABLE I

ARVI Access Details

| Step | Action |
|---|---|
| 1 (FIG. 2, step 202) | Read the data dependence chain from the DDT for the branch |

TABLE I-continued

ARVI Access Details

| Step | Action |
|---|---|
| 2 (FIG. 2, step 204) | Generate the register set from the dependence chain (RSE) |
| 3 (FIG. 2, steps 208 and 216) | In parallel, generate the index and tag a. Form a BVIT index from the XOR hash of register values b. Form a sum of the register set identifiers |
| 4 (FIG. 2, steps 210 and 218) | Index the BVIT, compare the ID and depth tags, return a prediction |

Four-way set associativity in the BVIT helps minimize the thrashing that often occurs in direct-mapped buffers. A 3-bit performance counter based on Heil's design [17] tracks the effectiveness of each entry and is used to select which entry to replace when a new entry is added. If all the values of the required registers in the dependence chain are available at the time of the prediction then the input state precisely defines the outcome and we call this instance of the branch a calculated branch. If a value is not available at the time of the prediction then by necessity the data dependence chain has values that depend on outstanding load instructions and the current machine state does not precisely define the branch outcome. We call this type of branch a load branch.

We estimate that the ARVI predictor requires six cycles to make a prediction. The breakdown of the latency for each action is shown in FIG. 2. Given the long latency for the ARVI predictor, it is helpful to include a fast one cycle first level predictor 220 to make an initial prediction that the ARVI predictor may override when its prediction is available. In addition to providing a fast initial prediction, the small first level predictor acts to filter easily predicted branches which results in dedicating ARVI resources to difficult branches.

The set of registers that generate the value for the branch comparison are available in the data dependence chain for the branch instruction's operand registers. The DDT as this information, but a complementary circuit, the RSE, is needed to extract it efficiently.

Figure 3:
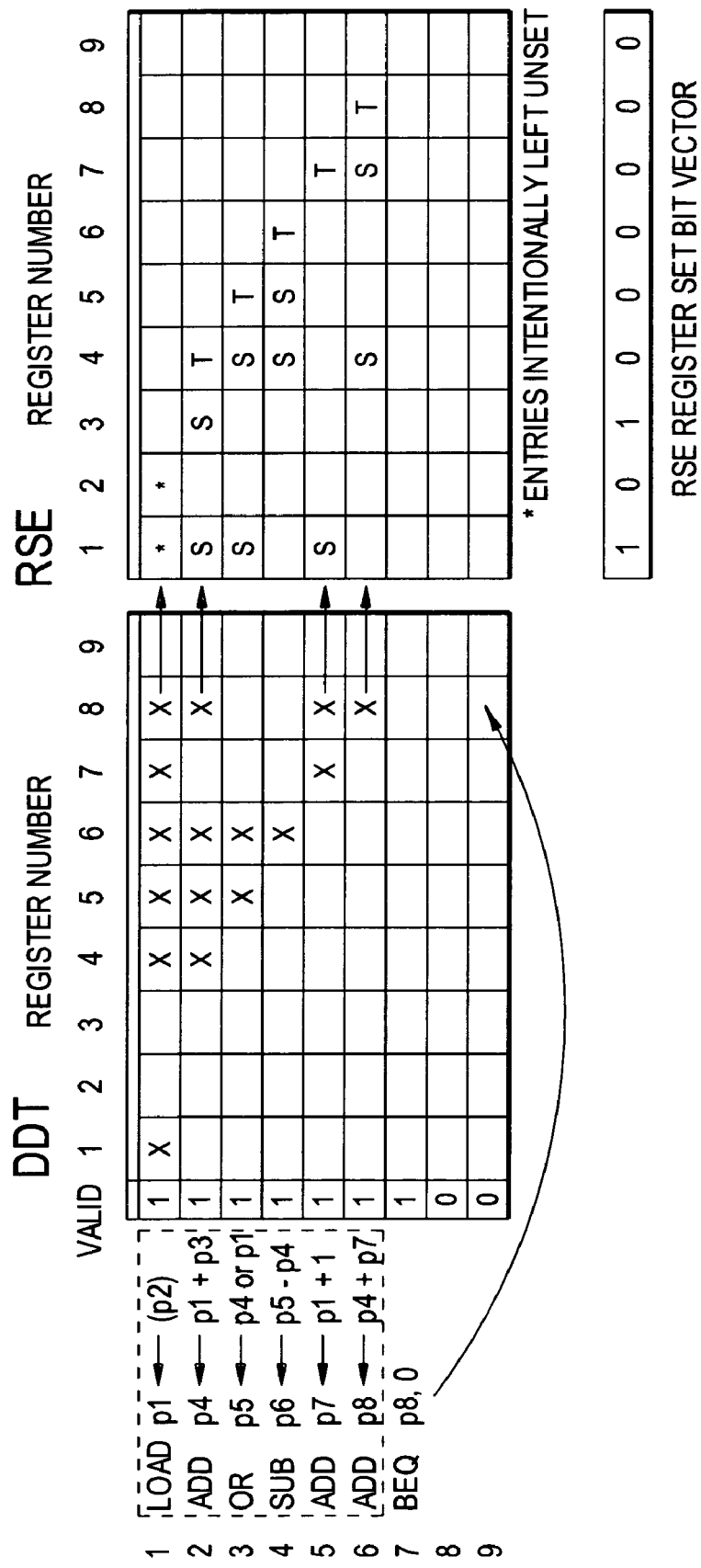
FIG. 3 shows the operation of RSE.

The operation of the RSE is shown in FIG. 3. The left hand table is the DDT in the same state as in the prior DDT example of FIGS. 1A and 1B. The RSE table on the right has the same identical dimensions as the DDT but each location contains 2 bits instead of one. When an instruction is inserted into the DDT (in stage 2, after the dependence chain information is read in stage 1), the source and destination registers for the instruction are marked in the corresponding entry in the RSE. A source register is marked in the example as S but is encoded as 01. The target register T is encoded as 10. Because the ARVI predictor treats load instructions as termination points in the chain, we do not set the source and target registers for loads (marked with '*' in the figure for this discussion).

When a branch arrives (instruction 7), we read the appropriate register entries from the DDT for the branch's operand registers (only p8 in the example). The marks indicating the data dependence chain form a bit vector that is used as enables to activate instruction entries in the RSE. If the branch instruction has two source operands then the bit vector for the enables is the OR of the two DDT entries. Each register entry in the RSE (the vertical dimension of the RSE in the figure) is spanned by two bit-lines to support the three encodings {Unused='11', Source='10', Target='01'}. We create the register set by precharging these bit-lines and then enabling the RSE instruction entries with the DDT data dependence chain bit vector. Any element in the RSE that is set to 'S' in the selected rows will discharge the low order bit-line (bit[0]). Similarly, any element set to 'T' will discharge the high order bit-line (bit[1]). The resulting 2-bit value is consolidated to a single bit via the function result=bit[1] & $\overline{bit[0]}$. The result is '1' if and only if one of the selected instructions uses the register as a source and none use it as a target. This function removes registers from the chain whose values are calculated by other instructions in the chain. Such registers are redundant. In the present example, the final set of registers is {p1, p3}. Notice that p4 and p7 are eliminated since their values are determined from p1 and p3. The register p1 is included because with ARVI loads are terminators of the DD chain. The register p3 is in the set because its value is currently available (thus, the instruction that set p3 has been committed and removed from the ROB and DDT)

Figure 4A:
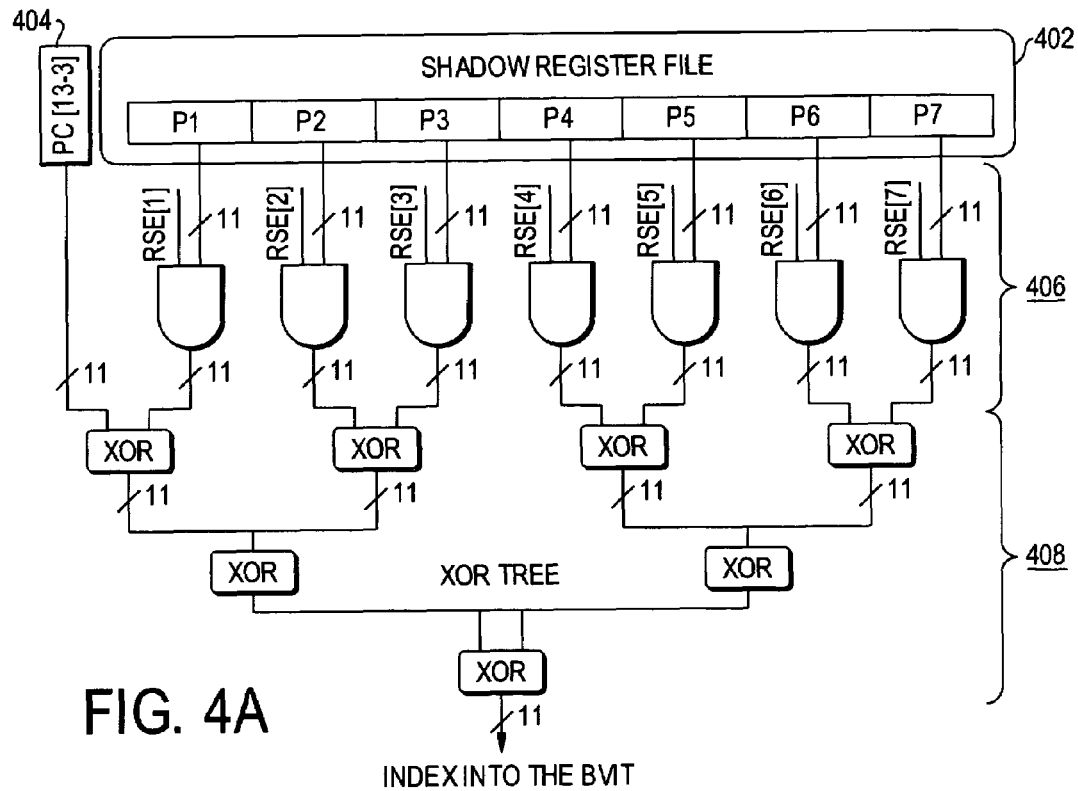
FIGS. 4A and 4B show the generation of values for ARVI.

The index into the BVIT is the XOR of the low order N bits of the values in the registers specified by the RSE register set bit vector. For illustration purposes, the BVIT table is configured as 2K entries with 4-way set associativity, thus, N=11 bits. To avoid additional register file ports, a shadow set 402 of the registers is kept but only the low order 11 bits of the value, as is shown in FIG. 4A. A shadow register file for an Alpha 21264 with 72 physical integer registers would require 792 bits. Updates to the register file also update the duplicate set one cycle later. As shown in FIG. 4A, the low order bits 404 of the branch address and the 11-bit values of the shadow registers 402 selected by the RSE register set bit vector in the selector 406 are XOR'd in the XOR tree 408 to form the BVIT index. A microarchitecture with R physical registers requires (11×R) XOR gates in a tree ($\log_2 R$) deep.

Figure 4B:
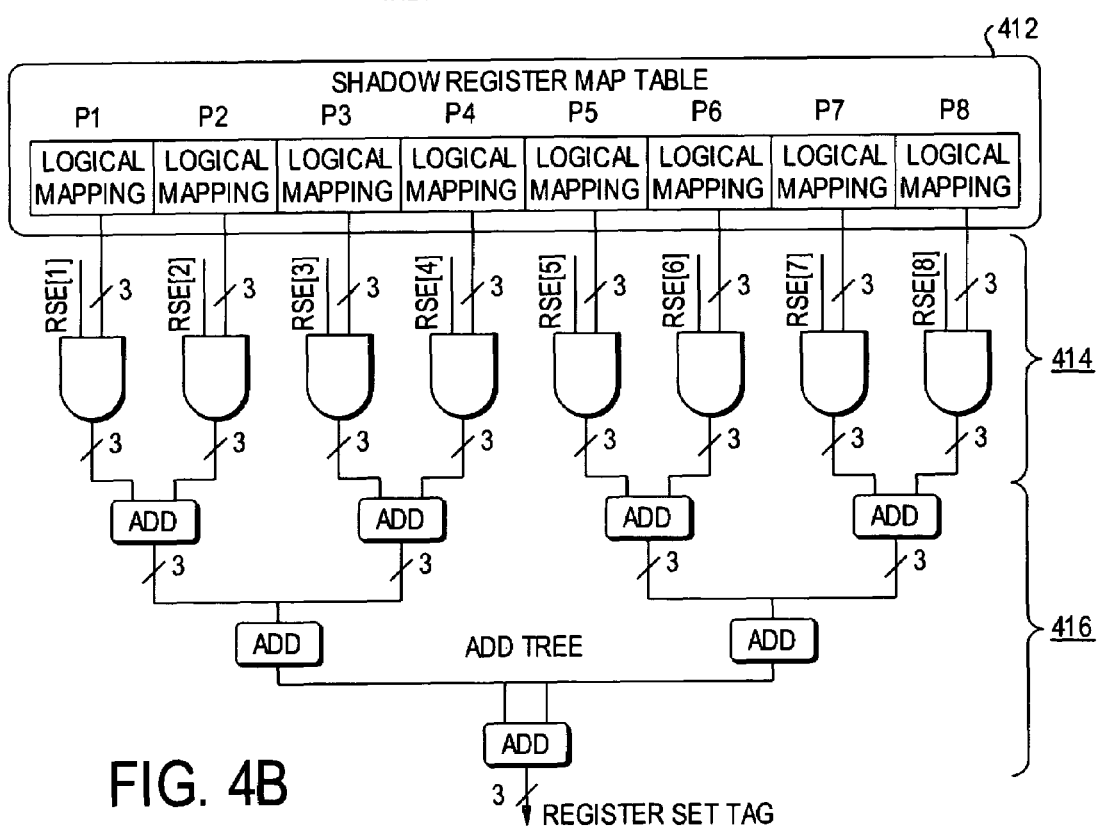

Differentiating paths to a branch can improve prediction accuracy [24]. ARVI uses the set of registers from the RSE as a path differentiator. Since a full concatenation of the register IDs is impractical, we have discovered that a simple 3-bit sum of the low order logical branch IDs is sufficient. The tag formation is shown in FIG. 4B. The logical branch IDs are used because the physical register assignments are likely to vary between occurrences. Thus, we keep a shadow table 412 of the register map table and update it whenever a register is allocated. We need only store the low order 3 bits of the logical register ID in the shadow map table 412 and structure it as a vector of 96 bits (assuming the ISA defines a set of 32 logical registers). The entries in the shadow map table 412 are selected by a selector 414. The summation is limited to a width of 3 bits. Since the result is used as a tag to verify a hit in ARVI, this addition tree 416 can have a multiple cycle latency and be pipelined. The tag calculation must complete within the time for the XOR tree hash plus the access time to the BVIT table. The pipeline timing is shown in FIG. 2.

Tight loops can experience identical paths to a branch on successive iterations. We find it is important to differentiate these occurrences; however, because the logical set of registers involved are identical in each iteration, we need an additional tag. In experimenting with various metrics, we found that a simple but useful choice is the maximum number of instructions spanned by the dependence chain. We maintain a 5-bit value for this distance. This distance is calculated by subtracting the indices for the head pointer and the furthest instruction back in the dependence chain. Detecting the furthest instruction requires detecting the leading '1' in the DDT bit vector for the particular DDT register entry, while considering that the DDT buffer may have wrapped around the end of the RAM. This problem is similar to that in [5] and can be solved with two priority encoders: one for the a non-wrapping chain and another for the case where the chain does wrap around the end of the RAM. The timing to generate this information is not critical and can be pipelined (see FIG. 2, step 212).

The evaluation methodology uses Simplescalar [4] for the PISA instruction set. Table 2 lists the microarchitectural parameters and Table 3 lists the benchmark suite. We selected the SPEC95 integer benchmarks because their branch behavior has been extensively studied which permits comparisons to be made across studies.

The purpose of the branch predictor is to improve the IPC performance of the microprocessor. Since the branch penalty for a mispredicted branch is directly related to the length of the processor pipeline (fetch through execute), we compare results for three different pipeline depths: 20-, 40-, and 60-cycle pipelines. These depths were selected because 20-cycles matches Intel's Pentium 4 design [13] and higher clock rates will likely continue to increase the number of stages in future designs [16, 28].

TABLE 2

| Architectural parameters | |
| --- | --- |
| Fetch queue | 4 entries |
| Fetch, decode width | 4 instructions |
| ROB entries | 256 |
| Load/Store queue entries | 32 |
| Integer units | 4 ALUs. 1 mult/div |
| Floating point units | 4 ALUs. 1 mult/div |
| Instruction TLB | 64 (16 × 4-way) 8K pages. 30 cycle miss |
| Data TLB | 128 (32 × 4-way) 8K pages. 30 cycle miss |
| L1 I-cache | 64 KB. 4-way. 32B line. {2, 4, 6}* cycles |
| L1 D-cache | 64 KB. 4-way. 32B line. {2, 4, 6}* cycles |
| L2 unified | 512 KB. 4-way. 64B line. {12, 18, 24}* |
| Memory latency | cycles {60, 80, 100}* cycles initial |

* latencies depend on pipeline length

We have extended the base simulator to support two levels of branch prediction. In all configurations, the first level of branch prediction is a hybrid predictor based on the Alpha EV8 branch predictor design called 2Bc-gskew [26]. There are three predictor tables and one table that controls which table provides the prediction. Each table is 1 KB in size for a total of 4 KB for the level one predictor and modeled as having single cycle access. Future technology estimates from [18] suggest that modest size predictor RAMs will be required for single cycle access times.

TABLE 3

| SPEC95 Integer Benchmarks | | |
| --- | --- | --- |
| Benchmark | Data set | Inst. Window |
| gcc | ref | 200M-300M |
| compress | ref | 3000M-3100M |
| go | ref | 900M-1000M |
| ijpeg | ref | 700M-800M |
| li | ref | 400M-500M |
| m88ksim | ref | 150M-250M |
| perl | ref | 700M-800M |
| vortex | ref | 2400M-2500M |

The Level-2 predictor is modeled as having a multicycle access time and is either a larger version of the base hybrid predictor (8 KB for each of the four RAMs for a total of 32 KB) or a comparably sized ARVI predictor (32 KB including the dependence tracking hardware). Upon detecting a branch, the first-level predictor returns an immediate prediction to direct the fetch unit. A number of cycles later (the number depending on the Level-2 predictor in use) the result from the larger Level-2 predictor is ready. If the second prediction agrees with the first then instruction fetching continues uninterrupted. In the hybrid L2, if the two predictions differ then the level 2 prediction is used. For the ARVI predictor, since the L1 hybrid is used to filter easily predicted highly biased branches, a confidence estimator [14] indicates whether the branch is more difficult to predict and that the ARVI predictor should be used. We explore the performance for pipeline latencies of 20, 40, and 60 cycles (stages). The access latencies for the caches and main memory shown in Table 2 vary with pipeline length. The values chosen are motivated by the results on future technology trends in [1].

In the ARVI design, we assume the BVIT RAM (32 KB 4-way) access requires 2, 4, and 6 cycles for each of the pipeline lengths, respectively. We use the BVIT RAM latency as the access time for the larger base hybrid predictor since the structure is similar to a 4-way RAM. Thus, in the present model, the baseline Level-2 hybrid predictor is significantly faster than ARVI. The access latencies are listed in Table 4.

TABLE 4

Predictor access latencies

| Predictor | Size (bytes) | Access time (cycles) | | |
|---|---|---|---|---|
| | | 20-cycle | 40-cycle | 60-cycle |
| Level-1 hybrid | 4 KB | 1 | 1 | 1 |
| Level-2 hybrid | 32 KB | 2 | 4 | 6 |
| Level-2 ARVI | 32 KB | 6 | 12 | 18 |

We simulate four configurations. The baseline configuration uses the hybrid predictor 2Bc-gskew both for the Level-1 and for the Level-2 predictors. The other three configurations use the same 2Bc-gskew predictor as the fast Level-1 predictor but use the ARVI predictor for the larger Level-2 predictor.

The base ARVI configuration is the current value configuration which makes predictions. We also attempt to increase the distance between a branch and a dependent load. The purpose is to increase the percentage of calculate branches, which are easier to predict as we show below. We simulate moving load instructions back as far as possible while respecting all data dependences. We aggressively compare addresses at runtime to disambiguate memory references, which is an optimization a compiler can often not perform. We call this version load back. As a bound on performance, we also simulate a perfect value configuration that uses the true register values even if they would not be available at the time of the prediction.

Figure 5A:
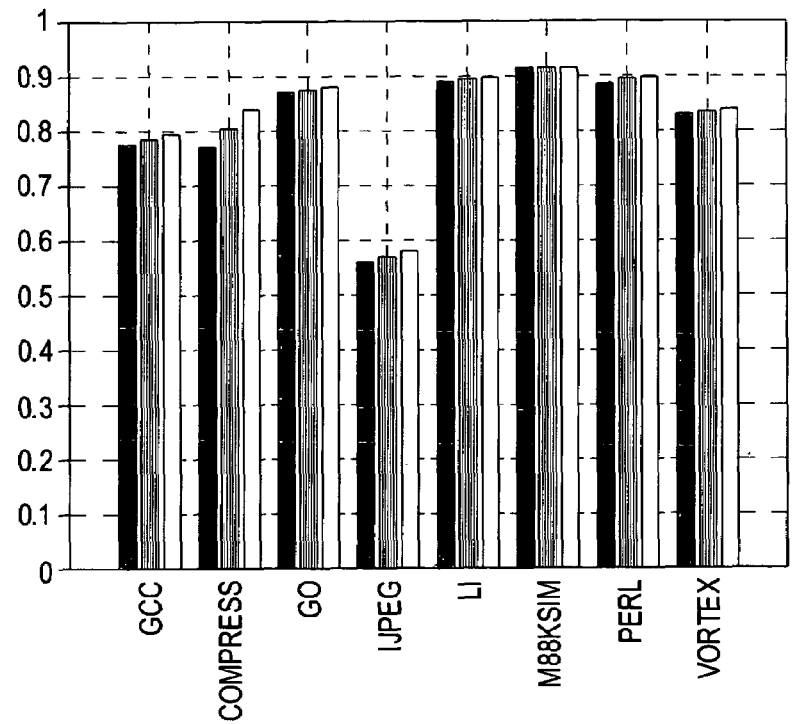
FIG. 5A shows the fraction of load branches in each application for which results were obtained.

Results will now be set forth. FIG. 5A shows the fraction of load branches in each application using current value. The remaining fraction are calculate branches. The large fraction of load branches—branches whose dependence chain requires values not yet available due to pending loads—is due to the fact that a large number of SPEC95 integer program branches are of the type load-evaluate-branch. Increasing pipeline depth increases the number of instructions in flight, which increases the probability that the branch dependence chain terminates in a non-committed load. Thus, a small number of calculate branches become load branches with increasing pipeline depth as indicated by the slight increase in the load branch percentage.

Figure 5B:
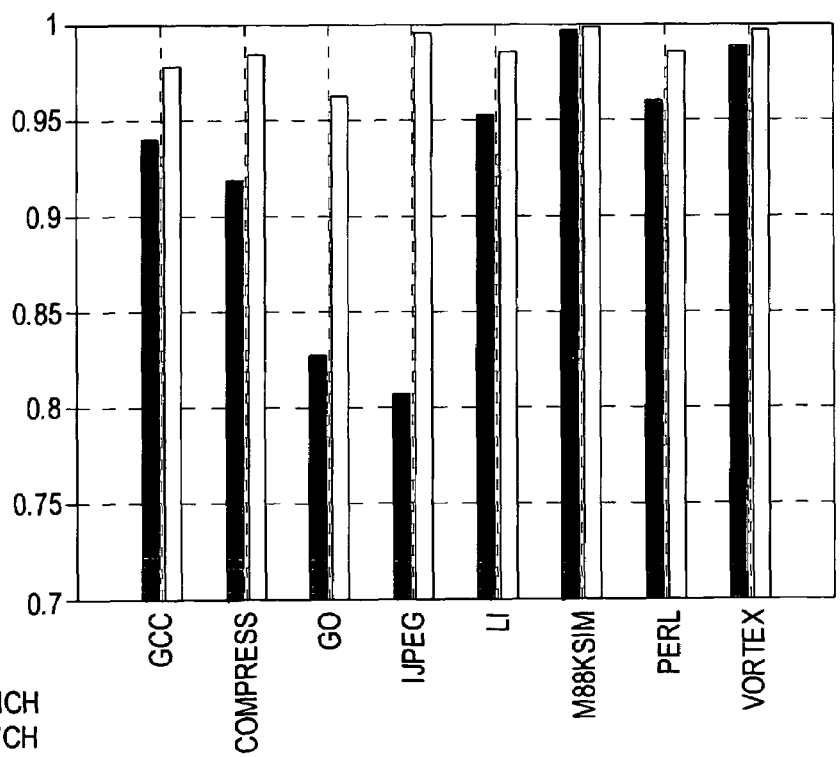
FIG. 5B shows the prediction accuracy of calculated vs. load branches in each application for which results were obtained.

FIG. 5B compares the prediction rates of the two classes. In general, load branches are more difficult to predict, particularly those loads whose values are not consistent when repeatedly encountered. Developing methods that move loads back in order to convert a load branch into a calculated branch, such as we model with load back, should help improve the overall prediction accuracy.

FIGS. 6A, 6C and 6E compare the prediction accuracy of the two-level hybrid and the two-level ARVI predictors (using current value, load back, and perfect value information) for different pipeline depths (20, 40 and 60 stages). FIGS. 6B, 6D and 6F compare the IPC for the various two level predictor configurations for the same pipeline depths. The first observation is that ARVI achieves a considerable boost in prediction accuracy, even with the current value scheme. For the 20-stage pipeline, near-perfect accuracy is achieved with m88ksim compared to 95% for the conventional hybrid. The result is a 75% improvement in IPC. Non-trivial prediction accuracy improvements are also realized for compress (93% for ARVI versus 90.5% for the hybrid) and li (95.5% to 93%). Compress achieves roughly a 8% IPC gain with ARVI and li achieves 16% improvement. Overall, a 12.6% IPC improvement is achieved with current value for a 20-stage pipeline.

The result for m88ksim highlights the special capability of ARVI. The improvement is due to a single branch in the routine lookupdisasm. The code (shown in FIG. 7) takes key and finds the corresponding opcode information. The opcode is found by hashing into an array and traversing the associated linked list. Manual inspection reveals that the contents of the hash table do not vary, so the number of iterations to traverse the linked list is fully defined by the value of the key. With the values of the register set that generate the value for key known when the branch is fetched, ARVI is able to make perfect predictions on when to exit the while loop. The while loop iteration count is embodied in the dependence chain depth tag. In contrast, the history-based hybrid predictor has difficulty in predicting the exit because the condition is not strongly correlated with history.

With the exception of ijpeg, the load back scheme only slightly increases predictor accuracy, as there are few opportunities for moving loads a sufficient distance to convert the branch to a calculate branch. The results for perfect value show the potential for ARVI when all load branches are essentially treated as calculate branches. Recall from FIG. 5 that the prediction accuracy for ARVI is much higher for calculate branches than for load branches. The impact is most pronounced for go and ijpeg which have particularly poor load branch mispredict rates. The resulting 25.1% increase in IPC for the 20-stage pipeline shows the potential for ARVI if more aggressive on-line load back schemes can be implemented.

Increasing the pipeline depth increases the misspeculation penalty, which improves ARVI's relative performance. For a 60-stage pipeline, ARVI achieves a 7% IPC improvement for go, 16% for compress, 18% for li, and 80% for m88ksim. The overall IPC improvement of 15.6% demonstrates the potential for the use of data dependence information coupled with register values to reduce branch prediction penalties in future processors.

While a preferred embodiment has been set forth in detail above, those skilled in the art who have reviewed the present disclosure will readily appreciate that other embodiments can be realized within the scope of the present invention. For example, numerical values are illustrative rather than limiting, as are disclosures of specific hardware architectures. Therefore, the present invention should be construed as limited only by the appended claims.

We claim:

1. A method for dynamically tracking data dependence of a plurality of instructions in a pipeline to be executed by a processor, the method comprising:

in a memory which is organized as a plurality of rows and a plurality of columns, each of the plurality of rows corresponding to a register and each of the plurality of columns corresponding to one of the plurality of instructions in the pipeline or to an instruction to be added to the pipeline, wherein the registers are assigned to the rows consecutively, providing in each intersection of a row and a column, an indication of whether the register corresponding to the row is data dependent on the instruction corresponding to the column; and identifying, in a row of the memory, which of the columns correspond to the plurality of instructions in the pipeline and which of the columns correspond to the instructions to be added to the pipeline.

2. The method of claim 1 further comprising:

allocating one of the columns to the instruction to be added responsive to the instruction to be added being added to the pipeline;

identifying which of the columns is allocated to the instruction being added;

determining a data dependency which each of the registers will have when the instruction being added is executed; and identifying, in the column allocated to the instruction to be added, the data dependency.

3. The method of claim 2, wherein the determining is performed in accordance with the columns corresponding to the registers which will be read in the instruction to be added.

4. A dynamic data dependence tracking system, comprising:

a plurality of registers;

a plurality of instructions in a pipeline;

at least one instruction to be added to the pipeline;

a memory organized as a plurality of rows and a plurality of columns, each of the plurality of rows corresponding to one of the plurality of registers and each of the plurality of columns corresponding to one of the plurality of instructions in the pipeline or to the at least one instruction to be added to the pipeline; and an indication at each intersection of a row and a column of whether a value of the register corresponding to the row is data dependent on the instruction corresponding to the column; and where at least one of the plurality of rows is configured to indicate which of the plurality of columns corresponds to the plurality of instructions in the pipeline and which of the plurality of columns corresponds to the at least one instruction to be added to the pipeline.

5. The dynamic data dependence tracking system of claim 4 where the memory includes a data dependence table to track a number of data dependent instructions trailing each of the plurality of instructions.

6. The dynamic data dependence tracking system of claim 5 where memory includes a counter to count a number of data dependent instructions trailing each of the plurality of instructions.

7. The dynamic data dependence tracking system of claim 6 where the counter is associated with each row in the data dependence table.

8. The dynamic data dependence tracking system of claim 6 where the counter is configured to update the number of data dependent instructions trailing each of the plurality of instructions on a cycle-by-cycle basis.

9. The dynamic data dependence tracking system of claim 6 where the counter is configured to provide data dependence chain information for each instruction thread associated with the plurality of instructions.

10. The dynamic data dependence tracking system of claim 7 where the data dependence chain information includes an average length of a chain associated with each instruction thread.

11. The dynamic data dependence tracking system of claim 6 comprising an execution unit to predict a branch responsive to the number of data dependent instructions trailing each of the plurality of instructions exceeding a predetermined threshold.

12. The dynamic data dependence tracking system of claim 11 comprising a branch execution unit to execute in parallel to the execution unit, a subset of the plurality of instructions responsive to a data dependence chain in the data dependence table.

13. The dynamic data dependence tracking system of claim 11 where the execution unit is configured to save power responsive to calculating a parallelism metric using a data dependence chain in the data dependence table.

14. The dynamic data dependence tracking system of claim 11 where the memory includes an issue queue; and where the execution unit is configured to size the issue queue responsive to calculating a parallelism metric using a data dependence chain in the data dependence table.

15. The dynamic data dependence tracking system of claim 11 where the execution unit is configured to identify critical instructions responsive to using a data dependence chain in the data dependence table.

16. The dynamic data dependence tracking system of claim 5 comprising a predictor configured to predict a branch instruction by correlating a value in at least one register associated with at least one instruction along a data dependence chain leading up to a branch.

* * * * *

UNITED STATES PATENT AND TRADEMARK OFFICE
CERTIFICATE OF CORRECTION

PATENT NO. : 7,571,302 B1 Page 1 of 1
APPLICATION NO. : 11/050454
DATED : August 4, 2009
INVENTOR(S) : Chen et al.

It is certified that error appears in the above-identified patent and that said Letters Patent is hereby corrected as shown below:

On the Title Page, item [56]:

At column 2, first page "Other Publications" line 20, please delete "Simuntaneous" and insert -- Simultaneous --.

Signed and Sealed this

Sixteenth Day of November, 2010

David J. Kappos
*Director of the United States Patent and Trademark Office*